United States Patent [19]

Proebsting et al.

[11] 3,881,121

[45] Apr. 29, 1975

[54] DYNAMIC RANDOM ACCESS MEMORY INCLUDING CIRCUIT MEANS TO PREVENT DATA LOSS CAUSED BY BIPOLAR INJECTION RESULTING FROM CAPACITIVE COUPLING

[75] Inventors: Robert J. Proebsting, Richardson; Vernon George McKenny, Garland, both of Tex.

[73] Assignee: Mostek Company, Carrollton, Tex.

[22] Filed: May 18, 1973

[21] Appl. No.: 361,434

Related U.S. Application Data

[62] Division of Ser. No. 202,987, Nov. 29, 1971, Pat. No. 3,778,783.

[52] U.S. Cl. ................ 307/303; 307/238; 307/304; 357/41

[51] Int. Cl. ........................ H01l 19/00; G11c 11/40

[58] Field of Search ........... 307/238, 279, 304, 303; 357/41, 47

[56] References Cited

UNITED STATES PATENTS

| | | | |
|---|---|---|---|
| 3,488,516 | 1/1970 | Kruschke | 307/244 |
| 3,593,037 | 7/1971 | Hoff, Jr. | 307/238 |
| 3,699,537 | 10/1972 | Wahlstrom | 307/238 X |
| 3,702,466 | 11/1972 | Nakagiri et al. | 307/238 X |
| 3,739,355 | 6/1973 | Radcliffe, Jr. | 307/238 X |
| 3,760,378 | 9/1973 | Burns | 307/238 X |

*Primary Examiner*—Michael J. Lynch
*Attorney, Agent, or Firm*—Hubbard, Thurman, Turner & Tucker

[57] ABSTRACT

A dynamic random access memory utilizing MOSFET transistors formed on a single semi-conductor chip is described. The random access memory utilizes 1,024 binary storage cells arrayed in rows and columns. Each row of cells has a read line and a write line. Each column of cells has one data line used for both read and write functions. Each cell is comprised of a write transistor and a pair of read transistors. The write transistor couples a capacitive storage node to the data line and is controlled by the write line.

The read transistors are connected in series between the data line and $V_{SS}$, and one is controlled by the read line and the other is controlled by the voltage on the storage node. A sense amplifier is provided for each data line and is used to apply data through the write transistor to the storage node, and to sense the state of the second read transistor controlled by the data stored on the storage node. The chip includes row and column address means for selecting a particular cell for either read or write mode.

The chip also includes a number of features to prevent bipolar injection caused by forward biasing a PN junction as a result of capacitive coupling between various nodes in the circuit, and other features which prevent the loss of data from the storage node.

4 Claims, 4 Drawing Figures

DYNAMIC RANDOM ACCESS MEMORY INCLUDING CIRCUIT MEANS TO PREVENT DATA LOSS CAUSED BY BIPOLAR INJECTION RESULTING FROM CAPACITIVE COUPLING

This is a division of application Ser. No. 202,987, filed Nov. 29, 1971, now U.S. Pat. No. 3,778,783.

This invention relates generally to digital data processing systems, and more particularly relates to a random access memory fabricated with conductor-insulator-semiconductor field effect transistors in integrated circuit form.

In recent times, random access memories have been devised utilizing metal-oxide-semiconductor field effect transistors (MOSFET) or other conductor-insulator-semiconductor field effect transistors integrated circuit technology, all of which are hereafter referred to as MOSFET's for simplicity. These systems have used binary bit storage cells comprised of four MOS transistors connected as a flip-flop to provide a static memory. Because of the relative complexity, size and power requirements of these static memory cells, random access memories using dynamic storage cells with only three MOS transistors have also been devised. The dynamic memory cells which have been partially successful have been smaller in size, thus permitting larger number of bits of storage on a single integrated circuit. However, these circuits normally require a read line and a write line for each row of cells and a pair of data lines for each column of cells, thus limiting the size reduction which can be achieved. Storage cells utilizing a pair of data lines for each column and a single address line for each row have been proposed but have not achieved any notable success for various reasons.

A system is also provided to prevent injection as a result of capacitive coupling between the data lines and the row address lines. This system comprises coupling the data lines to the row address lines under circumstances where capacitive coupling can occur, and passing the current from such lines through a resistance to $V_{SS}$ so that equal and opposite voltage spikes will be produced, thus cancelling out undesired transients.

BRIEF DESCRIPTION OF THE DRAWINGS

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1A:
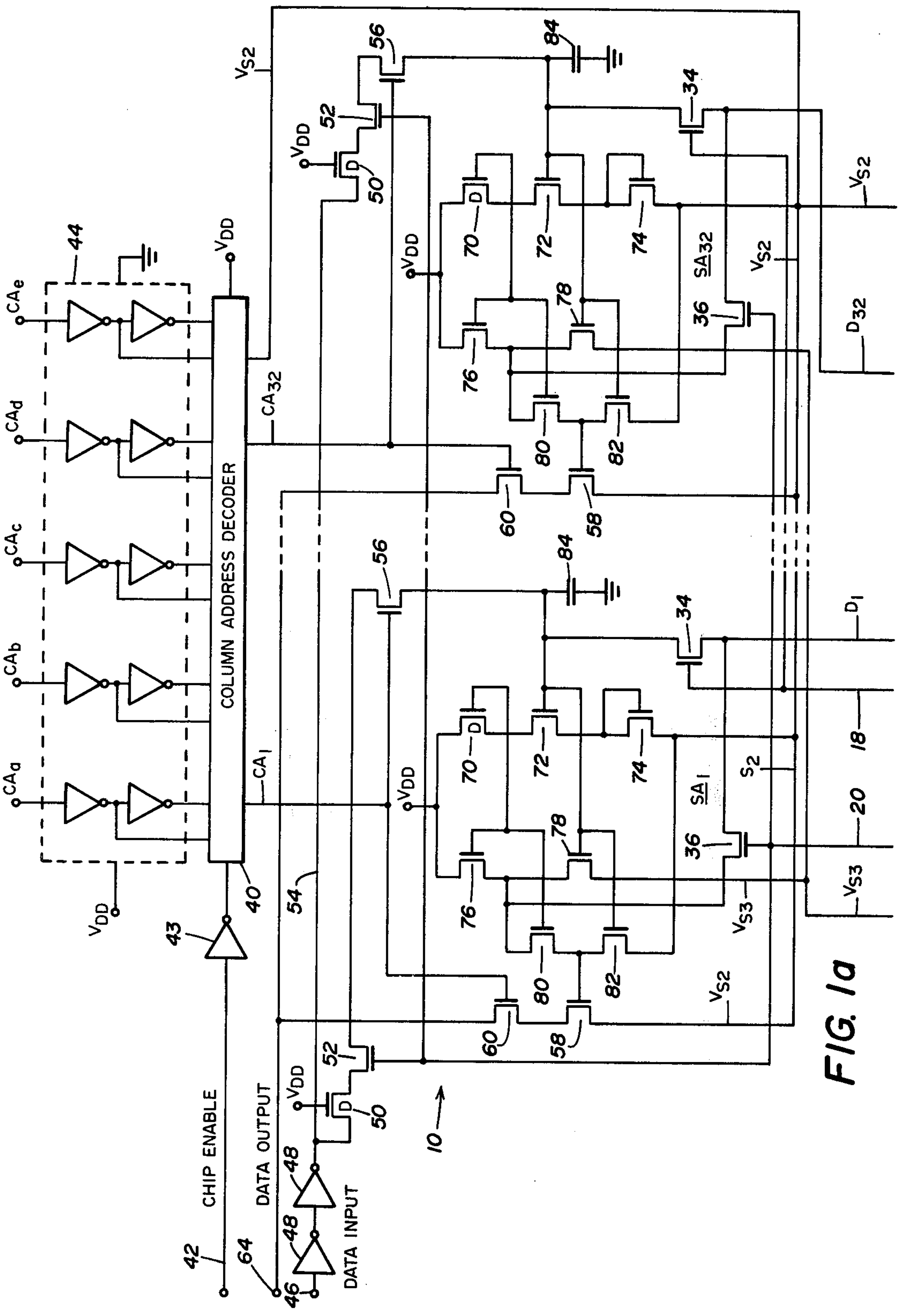
FIGS. 1*a* and 1*b*, taken together, are a schematic circuit diagram of a random access memory in accordance with the present invention.
Figure 1B:
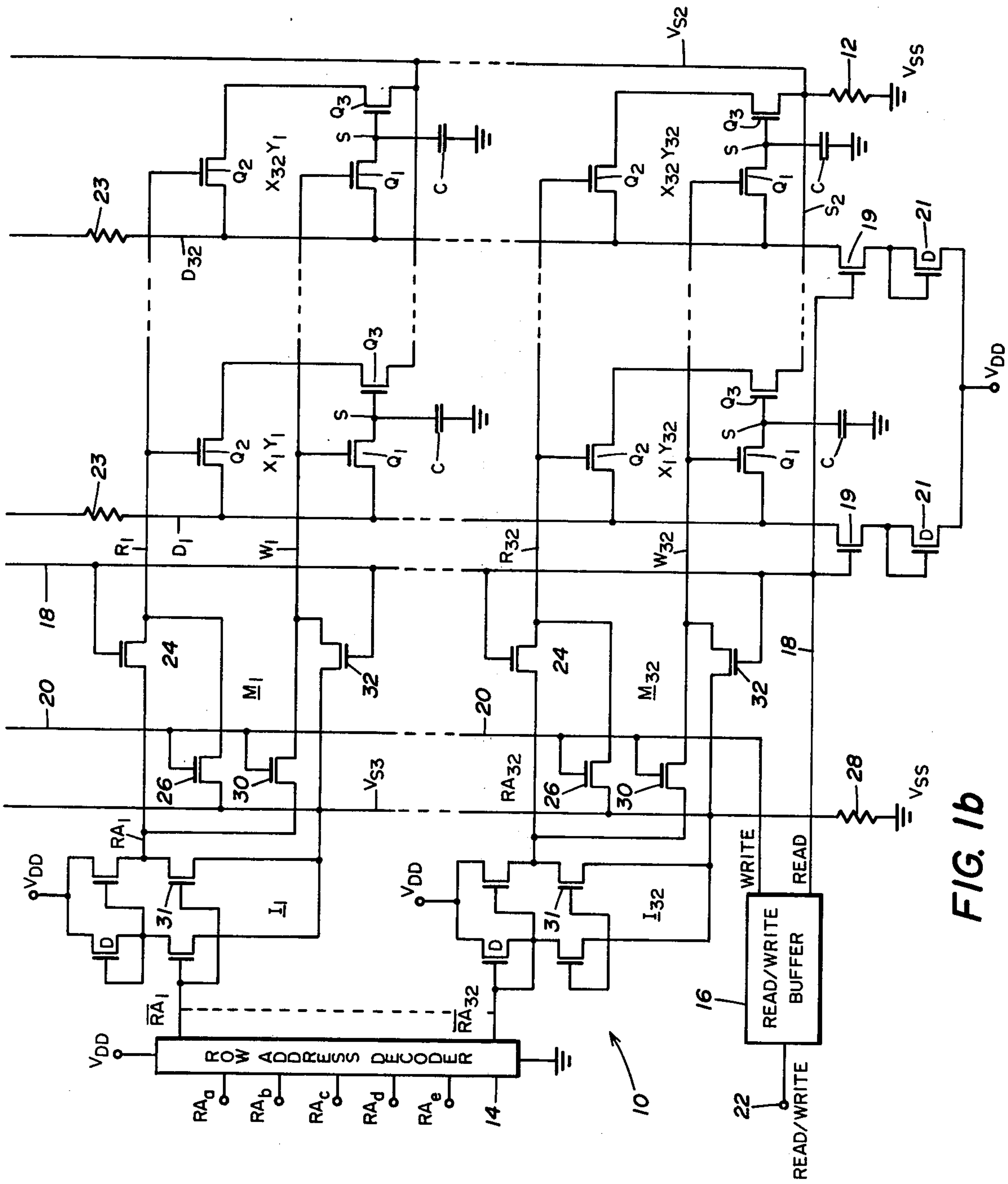

A random access memory in accordance with the present invention is indicated generally by the reference 10 in FIGS. 1*a* and 1*b*. The random access memory 10 is formed primarily of a matrix of 1,024 binary storage cells $X_mY_n$. The cells are arranged in 32 rows and 32 columns, with the subscript *m,n* designating the columns and rows, respectively. Only four cells are illustrated in FIG. 1, cells $X_1Y_1$, $X_{32}Y_1$, $X_1Y_{32}$, and $X_{32}Y_{32}$. These cells are disposed at the four corners of the matrix, cell $X_1Y_1$ being in column 1, row 1; cell $X_{32}Y_1$ being in column 32, row 1; cell $X_1Y_{32}$ being in column 1, row 32; and cell $X_{32}Y_{32}$ being in column 32, row 32. All transistors of the memory 10 are p-channel, enhancement mode devices unless indicated as being p-channel depletion mode devices.

Each of the cells $X_mY_n$ is comprised of a write transistor $Q_1$, and first and second read transistors $Q_2$ and $Q_3$. A storage node S is capacitively coupled to the substrate voltage $V_{SS}$ by capacitance C. Data lines $D_1$–$D_{32}$ are provided for the 32 columns. Read lines $R_1$–$R_{32}$ and write lines $W_1$–$W_{32}$ are provided for the 32 rows. The write transistor $Q_1$ of each of the cells connects the storage node S to the respective data line and is controlled by the respective write line $W_n$. The first and second read transistors $Q_2$ and $Q_3$ are connected in series and couple the respective data line $D_n$ to $V_{SS}$, which is typically +5.0 volts, through a secondary source voltage line $V_{S2}$ and a diffused resistor 12. The first read transistor $Q_2$ is controlled by the respective read line $R_n$, and the second read transistor $Q_3$ is controlled by the voltage on the respective storage node S. The data lines $D_1$–$D_{32}$ are typically diffusions, and the read and write line $R_1$–$R_{32}$ and $W_1$–$W_{32}$ are typically metal strips. The data lines $D_1$–$D_{32}$ are connected through enhancement mode transistors 19 and depletion mode load transistors 21 to the drain voltage $V_{DD}$, which is typically −12 volts. The data lines $D_1$–$D_{32}$ also have a distributed resistance which is represented by the resistors 23.

Data may be stored on a selected storage node S by bringing the respective write line $W_n$ to a negative level, referred to as a logic "1" level, to turn the respective write transistor $Q_1$ on. The respective data line $D_m$ is then driven to a voltage approaching $V_{SS}$ to store a logic "0" level on node S, or to a voltage approaching $V_{DD}$ to store a logic 1 level. Write line $W_n$ is then taken back to the logic 0 level to turn write transistor $Q_1$ off and capture the voltage charge on node S. Data can be read from the selected cell by bringing the respective read line $R_n$ to a negative level approaching $V_{DD}$ to turn the first read transistor $Q_2$ on. Then the data line $D_m$ is connected by transistor 19 through the load transistor 21 to $V_{DD}$. If the voltage stored on node S is below the threshold of transistor $Q_3$, which by definition is a logic 0 level, the voltage on the respective data line $D_m$ will approach $V_{DD}$. However, if the voltage stored on storage node S is above the threshold voltage of transistor $Q_3$, which is by definition a logic 1 level, then data line $D_m$ will reach a negative voltage level substantially less than $V_{DD}$. These voltage levels are then representative of the data stored on the cell.

A row address means is comprised of a decoder 14, 32 inverters $I_1$–$I_{32}$ and 32 read-write multiplexers $M_1$–$M_{32}$. The decoder 14 has five TTL compatible logic inputs $RA_a$–$RA_e$ and 32 output lines $\overline{RA}_1\overline{RA}_{32}$ which carry MOSFET logic levels. For any combination of TTL logic level inputs $RA_a$–$RA_e$, only one of the output lines $\overline{RA}_1\overline{RA}_{32}$ will be at a MOSFET logic 0 level, with the remainder being at a MOSFET logic 1 level. As used in this disclosure, the MOSFET logic 1 level is near $V_{DD}$, which is typically about −12.0 volts, and the MOSFET logic 0 level is near $V_{SS}$, which is typically +5.0 volts. The TTL logic 1 level is typically $V_{SS}$ or +5 volts, and the TTL logic 0 level is typically ground potential. The multiplexers $M_1$–$M_{32}$ are controlled by a read-write buffer 16 which produces read and write signals of predetermined time relationship on lines 18 and 20, respectively, in response to a single binary input on read-write input 22. The read-write generator 16 is hereafter described in greater detail. The logic level on the selected row address lines $\overline{RA}_1$–$\overline{RA}_{32}$ is then inverted by inverters $I_1$–$I_{32}$ and multiplexed to either the respective read or the respective write line $R_1$–$R_{32}$ or $W_1$–$W_{32}$ by the multiplexers $M_1$–$M_{32}$.

Each of the multiplexers $M_1$–$M_{32}$ is comprised of transistors 24 and 26 which connect the respective read lines $R_1$–$R_{32}$ either to the output of the respective inverter or to a secondary source voltage line $V_{S3}$. Line $V_{S3}$ is connected through a diffused resister 28 to $V_{SS}$ to prevent injection as will presently be described. Similarly, the write lines $W_1$–$W_{32}$ are connected through transistors 30 and 32 either to the outputs of the respective inverters $I_1$–$I_{32}$ or to the source voltage line $V_{S3}$. Transistors 24 and 32 are controlled by the voltage on read line 18, and transistors 26 and 30 are controlled by the voltage on write line 20.

Sense amplifiers $SA_1$–$SA_{32}$ are provided for the thirty-two columns. The respective data lines $D_1$–$D_{32}$ are coupled to the inputs of the respective amplifiers $SA_1$–$SA_{32}$ by transistors 34, all of which are controlled by read line 18. The respective data lines $D_1$–$D_{32}$ are also coupled to the non-inverting outputs of the respective sense amplifiers $SA_1$–$SA_{32}$ by transistors 36 which are controlled by write line 20.

Five column address inputs $CA_A$ through $CA_E$ which are at TTL logic levels are applied through inverter stages, indicated generally by the reference numeral 44, to a column address decoder 40. The decoder produces a MOSFET logic 1 level on only one of 32 column address lines $CA_1$–$CA_{32}$ which control the inputs to and outputs from the respective sense amplifiers $SA_1$–$SA_{32}$ as will presently be described. Data may be input to a common data input bus 54 through terminal 46 and inverters 48.

A chip enable input 42 is connected through an inverter 43 to the column address decoder 40. The chip enable signal disables the column address decoder 40 when desired so that all 32 outputs $CA_1$–$CA_{32}$ are at a logic 0 level for purposes which will hereafter be described in detail.

Data from bus 54 may be input to each of the amplifiers through a separate depletion model MOSFET 50, and transistors 52 and 56. The gate of depletion mode device is connected to $V_{DD}$ and this device prevents the positive transition of the write line 20 from coupling through transistor 52 and driving the output of the inverter 48 positive and causing injection. The transistors 52 are controlled by write line 20 and the transistors 56 are controlled by the respective column address lines $CA_1$–$CA_{32}$.

A data output stage comprised of transistors 58 and 60 is provided for each of the sense amps $SA_1$–$SA_{32}$. Transistors 58 are controlled by the output of the respective amplifiers, and transistors 60 are controlled by the respective column address lines $CA_1$–$CA_{32}$. The data output line 64 is normally connected through an external resistor to ground potential. Thus, if both transistors 58 and 60 for a particular sense amplifier are turned on, the output line 64 will move toward $V_{SS}$, or +5 volts, which is a TTL logic 1 level. However, if at least one of the transistors 58 and 60 is off in all 32 columns, the output bus 64 will be at ground potential, which is a TTL logic 0 level.

Each of the sense amps $SA_1$–$SA_{32}$ has an input stage comprised of depletion mode transistor 70 and enhancement mode transistors 72 and 74, a first output stage comprised of enhancement mode transistors 76 and 78, and a second output stage comprised of enhancement transistors 80 and 82. The inherent capacitance at the input of the input stage is represented by capacitor 84 and is used to store the input voltage to the amplifier. The input voltage is coupled to the gates of transistors 72, 78 and 82. The output of the input stage controls transistors 76 and 80. It will be noted that the input stage is connected between $V_{DD}$ and the secondary source voltage line $V_{S2}$. The inverting stage is connected between $V_{DD}$ and the secondary source voltage line $V_{S3}$. The inverting output stage is connected between the output of the inverting stage and the secondary source voltage line $V_{S2}$. The use of different drain voltages and different source voltages for the various stages of the amplifiers $SA_1$–$SA_{32}$ are to prevent injection and to reduce power consumption as will hereafter be described in greater detail.

The entire random access memory 10 is formed on a single monolithic semi-conductor chip and is packaged in a standard 16 pin package. In this regard, it will be noted that the 16 pins comprise the five row address inputs $RA_a$–$RA_e$, the five column address inputs $CA_a$–$CA_e$, the chip enable input 42, data input 46, read-write input 22, data output 64, the drain voltage $V_{DD}$, and the primary source voltage $V_{SS}$. The source and drain voltage are shown at various places over the circuit diagram, but it is to be understood that only one pin is required for each. However, the resistors 12 and 28 produce internal secondary source voltages $V_{S2}$ and $V_{S3}$ which are used to prevent injection as will presently be described.

The random access memory is operated essentially by a read cycle and a write cycle. A write cycle must always be preceded by a read cycle as will hereafter be described in greater detail. However, a number of read cycles may be made in succession merely by changing the address inputs. A refresh cycle is merely a read cycle followed by a write cycle with the row to be refreshed addressed and the column decoder disabled by chip enable input 42. A read-modify-write cycle is also possible merely by reading and modifying the data before applying the modified data to the data input and switching to write mode.

In order to illustrate a read cycle, assume that data is to be read from storage cell $X_1Y_1$. Logic levels would then be impressed upon row address input lines $RA_a$–$RA_e$ in a combination which would produce a logic 0 level on output $\overline{RA}_1$ of the row address decoder 14 and a logic 1 level on outputs $\overline{RA}_2$–$\overline{RA}_{32}$. Inverter $I_1$ then produces a logic 1 level on row address line $RA_1$. The remaining row address lines $RA_2$–$RA_{32}$ are at logic 0 level as a result of inverters $I_2$–$I_{32}$, the logic 0 level. Logic levels are also applied to column address inputs $CA_a$–$CA_e$ in a combination such that output $CA_1$ is at a logic 1 level and outputs $CA_2$–$CA_{32}$ are all at a logic 0 level.

Read/write input 22 is raised to a TTL logic 1 level which results in read line 18 going to a MISFET logic 1 level, and write line 20 going to a logic 0 level. As a result, transistor 24 of multiplexer $M_1$ is turned "on" by the logic 1 level on read line 18, thus raising read line $R_1$ to a logic 1 level. At the same time transistor 32 of multiplexer $M_1$ is turned on to insure that write line $W_1$ is reduced to the logic 0 level, thus insuring that transistor $Q_1$ is turned off. The logic 0 level of write line 20 also insures that transistors 26 and 30 of multiplexer $M_1$ are turned off. Since the row address lines $RA_2$–$RA_{32}$ are all at a logic 0 level, the logic levels of read and write lines 18 and 20 are irrelevant insofar as the operation of multiplexers $M_2$–$M_{32}$ are concerned, except that either line 18 or 20 and therefore read lines $R_2R_{32}$ and write lines $W_2W_{32}$ are all at a logic 0 level, and both transistors $Q_1$ and $Q_2$ of all cells in rows 232 are turned off.

The read line 18 also turns on all of the transistors 19 connected to the data lines $D_1$–$D_{32}$. As a result, the data lines $D_1$–$D_{32}$ are each driven to a negative potential that is dependent upon the voltage stored on the nodes S of the respective cells $X_1Y_1$–$X_{32}Y_1$ of the addressed row. For example, if the voltage stored on node S of cell $X_1Y_1$ is a voltage below the threshold voltage of transistor $Q_3$ which is defined as a logic 0 level, transistor $Q_3$ will remain off and data line $D_1$ will be charged to approximately $V_{DD}$–$V_t$. If, however, the voltage stored on the storage node S of cell $X_1Y_1$ is greater than the threshold voltage of transistor $Q_3$, which is defined as a logic 1 level, transistor $Q_3$ will be on and the data line $D_1$ will reach a voltage substantially less than $V_{DD}$–$V_t$. The final voltage of the data line will depend upon the size of transistors 21, 19, $Q_2$ and $Q_3$, which are typically selected so as to make final voltage on data line $D_1$ approximately one-fourth to one-half $V_{DD}$, depending upon the processing and voltage variables. Each of the data lines $D_2$–$D_{32}$ will similarly be at one of the two voltage levels, depending upon the voltage stored on the storage node S of the respective cell of row 1. It should be noted that a logic inversion occurs from the storage node S to the data line.

The logic 1 level on read line 18 also turns transistors 34 on so that the voltage on data lines $D_1$–$D_{32}$ is stored on capacitors 84 at the input of the sense amplifiers $SA_1$–$SA_{32}$. If the voltage on capacitor 84 is a logic 1 level, indicating that a logic 0 level was stored on the storage node S of cell $X_1Y_1$, a logic 0 is produced at the second output stage of the amplifier and applied to the gate of transistor 58. If a logic 0 level is stored on capacitor 84, a logic level 1 is produced at the second output stage of the amplifier and the transistor 58 is turned on.

As previously mentioned, column address line $CA_1$ is at a logic 1 level and transistor 60 is therefore turned on. The remaining column address lines $CA_2$–$CA_{32}$ are at logic 0 level so that the transistor 60 of sense amps $SA_2$–$SA_{32}$ are all turned off. As a result, if a logic 0 level was stored in cell $X_1Y_1$ so that the output amplifier $SA_1$ is at a logic 0 level, the data output 64 appears as an open circuit, because transistor 58 of sense amplifier $SA_1$ is turned off even though transistor 60 is turned on by the column address line $CA_1$. On the other hand, if a logic 1 had been stored on storage node S of cell $X_1Y_1$, the sense amp $SA_1$ would produce a logic 1 level, turning transistor 58 on. As a result, the data output line 64 would provide current from $V_{SS}$, which is typically +5 volts, to establish a voltage drop across an external resistor connecting the output 64 to ground.

It will also be noted that although transistor 56 of sense amp $SA_1$ is turned on by the logic 1 level on column address line $CA_1$, the input of amplifier $SA_1$ is not subjected to the voltage on data input line 54 because transistor 52 is turned off by the logic 0 level on write line 20.

A write cycle is always preceded by a read cycle because the data at the inputs of the amplifiers $SA_1$–$SA_{32}$ will be automatically written into the corresponding cell of the addressed row when the write line 20 goes to a logic 1 level. By preceding each write cycle with a read cycle, the data on the storage cells of the addressed row will be set up at the output of the sense amps $SA_2$–$SA_{32}$ in preparation of a write cycle. The cell in which data is to be written, for example cell $X_1Y_1$, is addressed by applying logic levels to row address inputs $RA_1$–$RA_e$ and column address inputs $CA_a$–$CA_e$ as heretofore described. The read/write input line 22 is brought to a logic 1 level so that read line 18 goes to a logic 1 and write line 20 goes to a logic 0 for a period of time sufficient to stabilize the voltage on the capacitors 84 at levels representative of the data stored in cells $X_1Y_1$–$X_{32}Y_1$. Then the read/write input 22 is changed to a logic 0 level so that the write line 20 is raised to a logic 1 level and the read line 18 goes to a logic 0 level. Transistors 19 and 34 are then turned off and transistors 36 are turned on for all columns. At the same time the data which is to be written into cell $X_1Y_1$ is applied to data input 46. When the write line 20 goes to a logic 1 level, transistor 52 is turned on, and since column address line $CA_1$ is also at a logic 1 level and transistor 56 is turned on, the data on line 54 is transferred to capacitor 84 of sense amplifier $SA_1$. Transistors 56 of the remaining sense amps $SA_2$–$SA_{32}$ remain off so as to maintain the previously established voltage level on the capacitors 84. Since transistors 36 of all of the sense amplifiers $SA_1$–$SA_{32}$ are turned on by the logic 1 level on write line 20, the data lines $D_1$–$D_{32}$ are driven either to a voltage approaching $V_{DD}$ or to a voltage approaching the secondary source line $V_{S3}$ depending upon the voltage stored on the input capacitors 84. For example, assume that a logic 0 level is to be written into cell $X_1Y_1$. When the read/write input 22 switches from read condition to write condition, write line 20 goes to a logic 1 level and read line 18 goes to a logic 0 level causing write line $W_1$ to go to a logic 1 level and read line $R_1$ to go to a logic 0 level. Write transistor $Q_1$ in all cells of the first row are turned on and read transistor $Q_2$ of all cells of the first row are turned off. Both transistors $Q_1$ and $Q_2$ of all other cells in the array are off. A TTL logic 0 level applied to data input 46 results in a logic 1 level being applied to capacitor 84 of amplifier $SA_1$. As a result, transistor 76 is turned off and transistor 78 is turned on so that data line $D_1$ goes to a voltage level approaching $V_{S3}$. Since write transistor $Q_1$ of cell $X_1Y_1$ is on, the storage node S is driven to the logic 0 level. Conversely, if a logic 1 is to be stored on node S, a logic 1 level is applied to input 46 which results in a logic 0 level at the input of amplifier $SA_1$. As a result, transistor 78 is turned off and transistor 76 is turned on, and data line $D_1$ is charged to a negative potential greater than the threshold voltage of transistor $Q_3$, which is a logic 1 level.

The same write function occurs in each of the cells $X_2Y_1$–$X_{32}Y_1$, except that the data read from the cells during the read cycle is rewritten in the respective cells. As a result of the rewriting of the data in all of the cells of the addressed row, the row is refreshed.

Since the read cycle is non-destructive, one or more read cycles can be performed in succession without being followed by a write cycle. This is accomplished merely by changing the row and column address inputs $RA_a$–$RA_e$ and $CA_a$–$CA_e$.

Since the storage cells are dynamic in nature, the data stored on the cells must be refreshed periodically. A refresh cycle comprises a read cycle followed by a write cycle with the chip disabled by applying the appropriate logic level to the chip enable line 42. This results in all of the column address lines $CA_1$–$CA_{32}$ being at a logic 0 level so that the data input transistors 56 of all of the sense amplifiers $SA_1$–$SA_{32}$ are turned off. As a result, the voltage stored on the capacitors 84 of the sense amps $SA_1$–$SA_{32}$ during the read cycle is inverted and written back into the cells of the addressed row during the write cycle as heretofore described to restore the original data in the cell.

A read-modify-write cycle can also be accomplished merely by taking data from the data output line 64, modifying the data, and returning the modified data to the data input 46, before the write cycle is initiated.

Consider now the manner in which the amplifiers $SA_1$–$SA_{32}$ function to detect the logic 0 and logic 1 levels of the storage nodes. Assume first that storage cell $X_1Y_1$ is to be interrogated. Assume also that a logic 1 level is stored on node S of cell $X_1Y_1$. At the beginning of a read cycle, read lines 18 go to a logic 1 level and write lines 20 go to a logic 0 level. Read line $R_1$ thus goes to a logic 1 level, and write line $W_1$ remains at a logic 0 level. Transistors 19 and 34 are also turned on by read line 18, and transistor $Q_2$ is turned on by line R1. Transistor $Q_3$ is turned on by the logic 1 level on the storage node S. Current from $V_{SS}$ then passes through resistor 12, secondary source voltage line $V_{S2}$, transistor $Q_3$, transistor $Q_2$, and transistors 19 and 21 to $V_{DD}$. Because of the need to make transistors 19 and 21 relatively large to obtain an acceptably fast switching time, this results in a voltage level at the gate of transistor 72 that is more than a threshold greater than $V_{SS}$ so that transistor 72 would normally be turned on. However, transistor 74, which has its gate connected to its drain, keeps the source of transistor 72 at a level greater than one threshold, so that transistor 72 nevertheless remains off when a data line $D_1$ is at the lowest voltage level resulting from transistor $Q_3$ being on, and thus permits the fast switching time.

The drain of transistor 72 goes to a negative level approaching $V_{DD}$ and this voltage is applied to the gate of transistors 76 and 80, turning both on. The voltage on capacitor 84 is sufficiently positive to substantially turn transistors 78 off, particularly since what current passes through transistors 78 also passes through resistor 28, producing a biasing voltage of several volts. The input voltage on capacitor 84 is also applied to the gate of transistor 82, which is turned off sufficiently to establish a sufficiently negative voltage on the gate of transistor 58 to turn it on so that data can be read when transistor 60 is turned on by the column address line $CA_1$. It will be noted that the output of the second stage 76 and 78 is at a logic 1 level, which is the level stored on the storage node S of the addressed cell $X_1Y_1$.

On the other hand, when a logic 0 is stored on node S, transistor $Q_3$ will be off. In that case, no current path is established through the cell to $V_{SS}$, and the input voltage to amplifier $SA_1$ will be $V_{DD}$ minus the threshold drop of transistor 19. As a result, transistors 72, 78 and 82 are turned on. The drain of transistor 82 is then at a voltage level approximately equal to the secondary voltage source $V_{S2}$. Since the source of transistor 76 is somewhat above $V_{SS}$, as a result of resistor 28, transistor 76 is turned off. Although transistor 80 is turned on, it does not conduct current because its drain is connected to the source of transistor 76 which is off. This assures that transistor 80 does not overcome transistor 82 and raise the gate of transistor 58 above threshold, which could not be tolerated since transistor 58 is the output transistor. This configuration also reduces power consumption.

Bipolar injection is one of the more difficult problems encountered in designing a dynamic memory utilizing MOSFET transistors. The device 10 is fabricated on an N-type substrate, for example, using diffused P-type regions for the source and drain of all transistors. As a result, a very large number of PNP bipolar transistors are formed on the chip. Bipolar transistor action is normally prevented by maintaining all of the P-type diffusions sufficiently negative with respect to the substrate to prevent forward conduction through the PN junctions. Ideally, the diffused P-type regions are always negative with respect to the substrate, so that the base-emitter junctions of the potential bipolar transistors will always be reverse biased. Otherwise, since the reverse biased PN junctions appear as base-collector junctions of bipolar transistors, bipolar action will result any time one of the PN junctions becomes forward biased to appear as a base emitter junction of a bipolar transistor. Injection of carriers into the substrate from a forward biased base-emitter junction may travel to the P-type regions which form the storage nodes S of the cells and destroy the charge on the storage node, representative of the data. The device 10 utilizes a number of circuit features to prevent such bipolar injection.

In accordance with the present invention, injection is prevented by transferring compensating negative charges laterally through a transistor to compensate for capacitively coupled positive spikes which might otherwise cause injection. This problem primarily occurs when a node is being switched from a negative level to a positive level and the node is capacitively coupled to a P-type diffusion which is already at a voltage near $V_{SS}$. As previously mentioned, the data lines $D_1$–$D_{32}$ are normally diffused lines disposed in parallel relationship. The read lines $R_1$–$R_{32}$ and write lines $W_1$–$W_{32}$ are normally metalized lines extending in parallel relationship transversely across all of the data lines $D_1$–$D_{32}$. As a result, each of the read-write lines is capacitively coupled to all 32 of the data lines as a result of the crossover and as a result of the overlap capacitance on the gates of transistors $Q_1$ and $Q_2$ of the various cells. While the capacitive coupling between each read line and the respective data line is relatively small, the combined effect may be significant. For example, each time a data line transitions in a positive direction, as would be the case between each read-write cycle when a logic 0 was read from the storage node and a logic 0 is to be written back on the storage node, a positive spike would be capacitively coupled to each of the read lines $R_1$–$R_{32}$. If a logic 0 is also being refreshed in all 32 of the cells in the row serviced by read line $R_1$, for example, this spike would be reinforced 32 times and could become quite significant. Since the node between transistors $Q_2$ and $Q_3$ is at a level near $V_{SS}$ prior to this transition, the capacitive coupling between the gates of the transistors $Q_2$ and this node could cause the node to go positive with respect to the substrate and thereby cause injection. However, in accordance with one aspect of this invention, each of the read lines $R_1$–$R_{32}$ and each of the write lines $W_1$–$W_{32}$ is always connected to secondary source voltage line $V_{S3}$ whenever the respective lines are at a logic 0 level. The only one of these 64 lines that is not connected to line $V_{S3}$ is at a logic 1 level. The remaining lines are connected either through transistors 26 and 30 of the respective multiplexer $M_1$–$M_{32}$ or transistor 31 of the respective inverters $I_1$–$I_{32}$ to the source line $S_3$. The only way that the data lines $D_1$–$D_{32}$ can make a positive transition is by current through transistors 36 and 78 to source line $V_{S3}$ and then through resistor 28 to $V_{SS}$. As a result of the current being passed from data line $D_1$ through resistor 28, a negative voltage spike is produced on line $V_{S3}$ which exactly compensates for the positive voltage spike impressed on read lines $R_1$–$R_{32}$ and write lines $W_1$–$W_{32}$. This is coupled through either transistors 31 and 24 or directly through transistors 26 or 32 to the respective read lines $R_n$ and write lines $W_n$, thus preventing any voltage spikes from occurring which could possibly cause injection. It will also be noted that since all of the data lines are coupled through the same resistor 28, the system is self-compensating for any number of data lines making the positive transitions at a given time. The resistor 28 is typically about 200 ohms and results in voltage drop of about 1 volt during normal operation, and up to 3 or 4 volts during positive data line transitions.

The use of diffused resistor 12 provides an internal secondary source voltage $V_{S2}$ which is more negative than $V_{SS}$. This provides a means for compensating for the fact that the logic 0 level stored on a storage node S may sometimes be substantially more negative than $V_{SS}$ because of the drop across resistor 28. However, the current through resistor 12 makes the source of transistor $Q_3$ of the cell sufficiently more negative to prevent the more negative logic 0 level on the storage node from turning transistor $Q_3$ on. As previously discussed, this more negative source voltage $V_{S2}$ is also used to advantage in the sense amplifiers $SA_1$–$SA_{32}$. It will be noted that all input buffer stages use $V_{SS}$ in order to interface with TTL logic, while all internal inverter stages utilize $V_{S2}$ to minimize injection.

Figure 2:
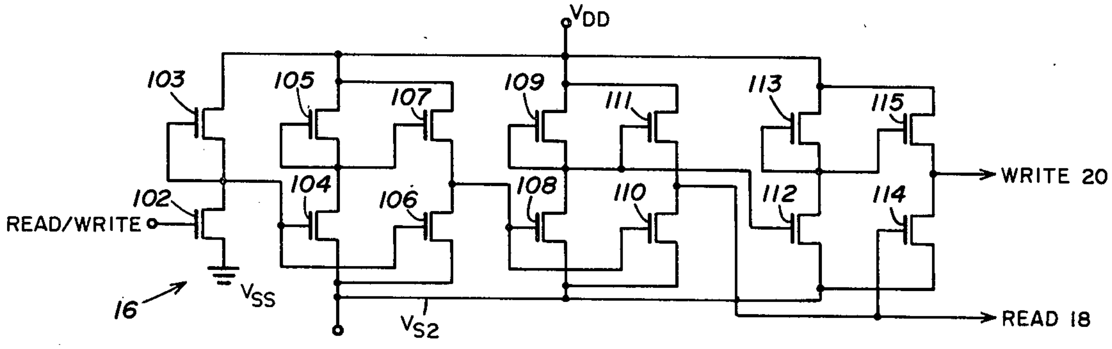
FIG. 2 is a schematic circuit diagram of the read-write generator of the circuit of FIGS. 1*a* and 1*b*.

Another injection problem occurs at the end of the write cycle when a logic 0 level is stored on the node S. Since the logic 0 level on node S is already near $V_{SS}$, the positive transition on the write line $W_n$ can be coupled through the gate overlap capacitance of transistor $Q_1$ to the storage node S. The positive going transition can drive node S sufficiently positive to cause injection. In accordance with the present invention, this is compensated by delaying the turnoff of transistor $Q_1$ a sufficient length of time after the respective data line D goes negative to permit the transfer of current to the storage node to compensate for the loss of charge due to decoupling. This is accomplished by a read/write generator 16 which is shown in detail in FIG. 2.

The read/write generator 16 has an input stage comprised of transistors 102 and 103 connected between $V_{DD}$ and $V_{SS}$. The output from the input stage is connected to the input of an inverter stage comprised of transistors 104–107. The output from the second inverter stage is coupled to a third inverter stage comprised of transistors 108–111. The output from the node between transistors 110–111 of the third inverter stage is the read line 18. The write line 20 is the output of a fourth inverter stage, comprised of transistors 112–115, which is driven from the third inverter stage. However, it will be noted that transistor 112 is driven from the output between transistors 108 and 109, while transistor 114 is driven from the output between transistors 110 and 111. As a result, the start of the positive transition of the write line 20 is delayed from the start of the negative transition of the read line 18 from the logic 0 level to the logic 1 level as a result of the last inverter stage. However, because the gate of transistor 112 is coupled to the node between transistors 108 and 109, the positive transition on the write line 20 occurs at a greater rate.

It will be noted that the read line 18 controls transistor 19 which charges the data line negatively when turned on, and also controls transistor 32 which connects the write line at $W_n$ to the secondary voltage source $V_{S3}$. The write line 20 controls transistor 30. As a result of delaying the positive transition of the write line 20 after the negative transition of the read line 18, the write line $W_n$ remains negative for a sufficient period of time after the data line goes negative to add sufficient negative charge to the storage node S to compensate for the positive charge coupled through transistor $Q_1$ by the positive transition of the write line $W_n$.

Figure 3:
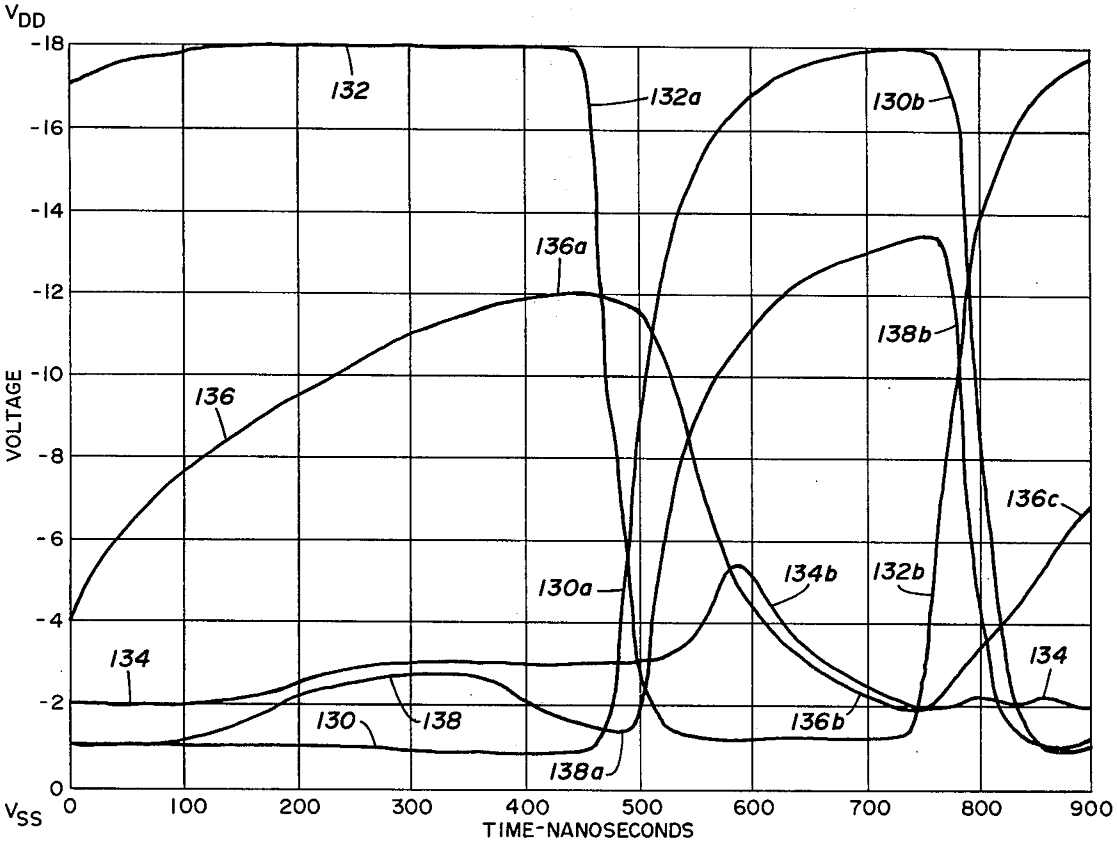
FIG. 3 is a plot of voltage with respect to time which serves to illustrate certain aspects of the present invention.

The time relationship of the voltages on read line 18 and write line 20 during a refresh cycle for a logic 0 level is illustrated in FIG. 3, the voltage on the write line 20 is indicated by trace 130, the voltage on read line 18 by trace 132, the voltage on the storage node S by trace 134, the voltage on data line $D_1$ by trace 136, and the voltage on write line $W_n$ by the trace 138. The lines illustrate the voltages which occur during a refresh cycle when the data being refreshed is at logic 0. The first portion of the cycle while the voltage on the read line 18 is at a logic 1 level and the voltage on the write line is at a logic 0 level, as indicated on lines 132 and 130 respectively, is a read cycle. The read cycle terminates on the positive transition **132*a* and the negative transition 130*a*. During the read cycle it will be noted that the data line voltage as represented by trace 136 reached a level 136*a*. During the write cycle, the sense amplifier drives the data line voltage back to the logic 0 level as represented by section 136*b* of the trace 136. It will be noted that when the write line voltage 138 exceeds the threshold voltage of transistor $Q_1$, the voltage on the storage node follows the data line voltage as indicated by section 134*b* of trace 134. At the end of the write cycle, the read line voltage makes a negative transition as illustrated at 132*b*, followed a short time later by a positive transition 130*b* in the write line voltage. The negative transition 132*b* of the read line voltage causes the data line to again go negative as illustrated by section 136*c*. The delay in the transition 138*b* after the data line begins the negative transition 136*c* results in sufficient negative charge being transferred to the storage node to offset the positive spike coupled to the storage node through the transistor $Q_1$ as a result of the positive transition 138*b***.

The invention also contemplates a number of measures for preventing injection. These include connecting the data lines and the read and write lines to a common point during the positive transition of the data lines, the point being connected by a resistance to $V_{SS}$ to cause cancellation of voltage spikes. This prevents injection due to positive going spikes. The invention also contemplates an internally produced secondary voltage source for all circuits other than those stages interfaced with the exterior of the circuit to provide added protection against injection.

Although preferred embodiments of the invention have been described in detail, it is to be understood that various changes, substitutions and alterations can be made therein without departing from the spirit and scope of the invention, as defined by the amended claims.

What is claimed is:

1. In a digital data processing integrated circuit utilizing field effect transistors and having a substitute supply voltage and having at least two lines which carry logic levels and which may be capacitively coupled, the improvement comprising circuit means connecting each of the lines to the substrate supply voltage through a common resistive path when both lines are to be at the logic level nearer the substrate supply voltage to thereby reduce transient voltages caused by such capacitive coupling which might cause injection.

2. The integrated circuit of claim 1 wherein there are a plurality of lines capacitively coupled to at least one common line, and all lines are connected through the common resistive path to the substrate supply voltage.

3. The integrated circuit of claim 1 wherein one of the lines is a diffused region in the substrate and the other line is a conductive line spaced from the diffused region by a layer of insulation.

4. The integrated circuit of claim 1 wherein there are a plurality of diffused lines of a first set extending in generally parallel relationship one to the other and a plurality of conductive lines of a second set extending generally parallel one to the other and crossing the lines of the first set and being spaced therefrom by a layer of insulation, the lines of both the first and second sets being connected through the common resistive path to the substrate supply voltage.

* * * * *